United States Patent [19]
Nuti

[11] Patent Number: 4,850,455
[45] Date of Patent: Jul. 25, 1989

[54] BRAKING SYSTEM FOR TWO-WHEELERS
[75] Inventor: Marco Nuti, Pisa, Italy
[73] Assignee: Piaggio & C. S.p.A., Genova, Italy
[21] Appl. No.: 176,117
[22] Filed: Mar. 30, 1988
[30] Foreign Application Priority Data
  May 4, 1987 [IT] Italy ................................ 20366 A/87
[51] Int. Cl.$^4$ ............................................ F16D 65/30
[52] U.S. Cl. .................................. 188/2 D; 188/24.16; 188/344
[58] Field of Search ................ 188/2 R, 2 A, 2 D, 16, 188/24.15, 24.16, 24.22, 204 R, 344, 349; 303/9.64

[56]       References Cited
       U.S. PATENT DOCUMENTS
  4,057,127  11/1977  Woodring ....................... 188/2 D X Primary Examiner—Duane A. Reger
Attorney, Agent, or Firm—Diller, Ramik & Wight

[57]          ABSTRACT

A braking system for two-wheelers is provided with a normal-duty actuation member which acts on both a front braking assembly and a rear braking assembly, and with an emergency actuation member which acts on one only of said braking assemblies; means are provided for balancing the actuation force applied by the normal-duty actuation member and the actuation force applied by the emergency actuation member on the common braking assembly, which enable the greater of the two braking actions to be applied as the braking action, for the purpose of preventing the jamming, and hence the skidding of the vehicle wheel on which such common braking assembly acts.

16 Claims, 5 Drawing Sheets

BRAKING SYSTEM FOR TWO-WHEELERS

The present invention relates to a braking system for two-wheelers.

It is known that the characteristic that all of the braking assemblies of a vehicle can be actuated contemporaneously by acting on a determined actuation member is a characteristic which has always been present on the four-wheel vehicles; for the two-wheelers, it was introduced in some applications, essentially for the purpose of offering a more efficacious braking with a normal-duty actuation member precisely acting on both the front braking assembly and the rear braking assembly of the vehicle, and with an emergency actuation member, which acts on one of them only, and which must be used in emergency situations.

The contemporaneous actuation of both of the braking assemblies of a two-wheeler can lead, as compared to the actuation of one only of the braking assemblies, to average reductions in the braking lengths of the order of 50% under nearly all the tyre-road adherence conditions.

The contemporaneous actuation produces, in fact, the maximum possible braking effect, under all friction conditions. Especially under conditions of low values of friction coefficient, the contemporaneous actuation demonstrates to be advantageous; in particular, it results advantageous relatively to the actuation of the rear braking assembly only, operation this which is normally performed by the greatest number of the two-wheeler users.

But, it must be taken into consideration that a drive type involving the contemporaneous usage of both of the two braking assemblies can more easily lead, in case of two-wheelers, to particular states of danger deriving from the possible jamming, and hence skidding, of the wheel on which both the normal-duty actuation member and the emergency actuation member act, when they are used jointly.

Such skidding condition can actually occur also on a four-wheel vehicle, but from it a particular level of dangerousness does not derive.

The purpose of the present invention is that of obviating the above said serious drawback.

Such purpose is achieved by means of a braking system for two-wheelers comprising a front wheel braking assembly, a rear wheel braking assembly, a normal-duty actuation member connected with both of said braking assemblies, and an emergency actuation member connected with one only of said braking assemblies, members for transmission of the actuation force from said actuation members to friction members of the said braking assemblies, wherein means are provided for balancing the actuation force applied by the normal-duty member and the actuation force applied by the emergency member on said one of said braking assemblies, with said balancing means enabling the greater of the two braking actions to be applied as the braking action.

Hereunder, some non-limitative examplifying forms are disclosed of practical embodiment of the present invention, as illustrated in the hereto attached drawing tables, wherein.

Figure 1:
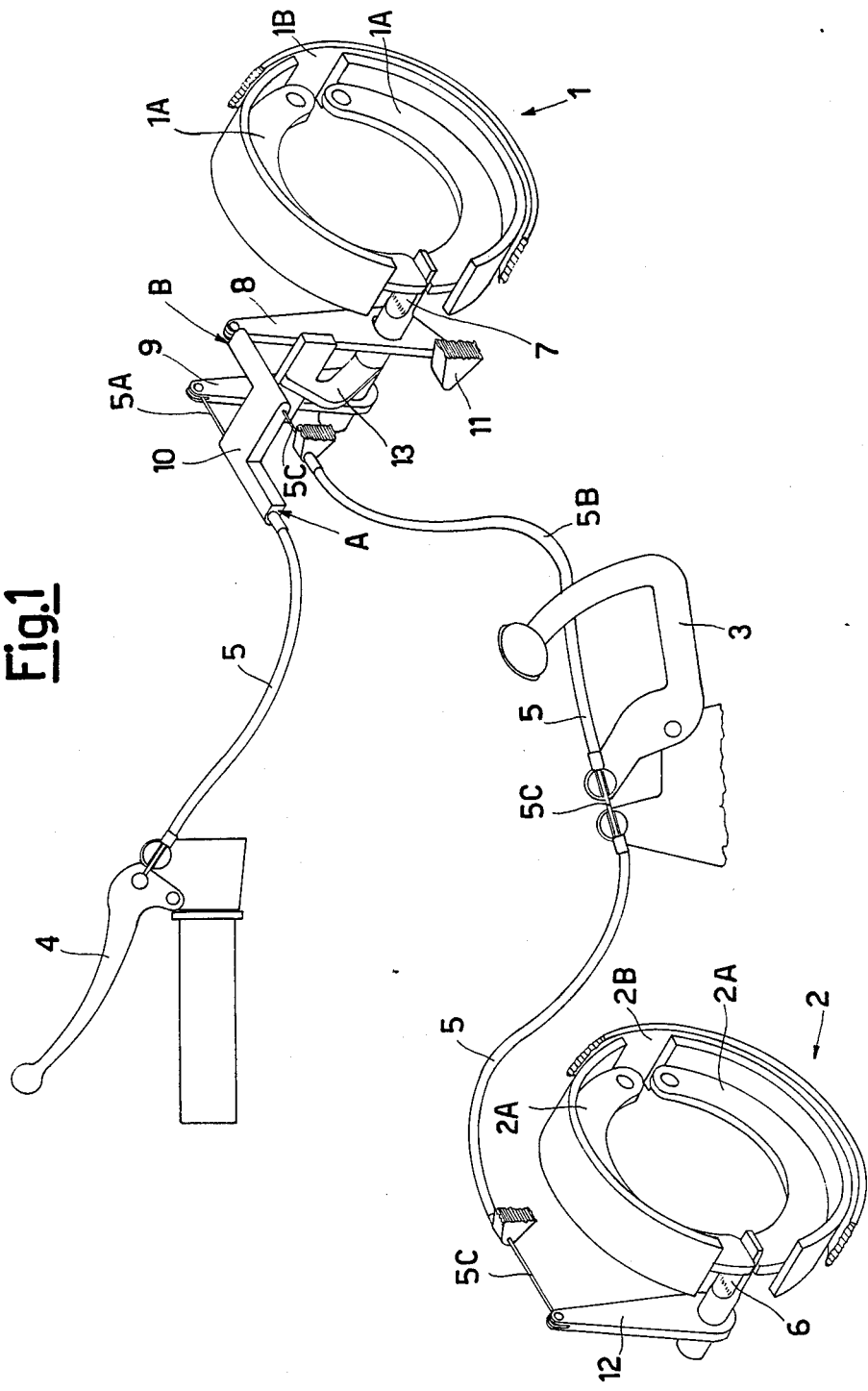
FIG. 1 shows a schematic view of a first braking system for two-wheelers, according to the invention.

The braking system for two-wheelers of FIG. 1 comprises a drum braking assembly 1 of the front wheel, a drum braking assembly 2 of the rear wheel, a normal-duty actuation member constituted by a pedal lever 3 acting on both said braking assemblies 1 and 2, an emergency actuation member constituted by a hand-lever 4 acting on the front braking assembly 1, means of transmission of the actions exerted on said members, constituted by tensile-resistant wires and related sheaths, generally indicated with 5. The braking system comprises furthermore a mechanical means of actuation of the braking assembly 2 of the rear wheel constituted by a cam 6, which moves two shoes 2A with friction linings against a drum 2B, partially shown, of the braking assembly 2, a mechanical means of actuation of the braking assembly 1 of the front wheel constituted by a cam 7 which moves two shoes 1A with friction linings against a drum 1B, partially shown, of the braking assembly 1, a first lever 8 connected to the means of transmission of the action exerted by the pedal lever 3, a second lever 9 connected to the transmission means of the action exerted by the hand-lever 4, said levers 8 and 9 acting on the cam 7 through a further lever 13 integral with the cam 7. A balancing element 10 is furthermore provided, interposed between said transmission means 5 and said levers 8 and 9.

In its resting position, shown in FIG. 1, the lever 8 is in contact with a stop element 11 integral with a fixed structure of the braking element; if, by starting from this situation, the hand-lever 4 is actuated, the end result is the rotation of the cam 7, thanks to the action applied by a wire 5A to the lever 9, which causes the lever 13, and hence the cam 7, to rotate, so to activate the braking assembly 1. Such traction can occur, in that the kinematic chain constituted by the stop 11, the lever 8, the balancing element 10, the wire 5A sheath, and the support of the hand-lever 4 results perfectly closed. In conclusion, a simple operation of the front brake assembly is obtained, as it can be obtained in the vehicles equipped with a traditional braking system.

If, vice-versa, the actuation of the hand-lever 4 takes place in a situation different from the rest situation, i.e., in a situation wherein the normal-duty member, i.e., the pedal lever 3, is already being actuated, the action exerted on said emergency actuation member, i.e., on lever 4, does not produce any additional useful effects, at least until on the A side of the balancing element 10 a force is not applied, of a magnitude equal to that already present on the B side of the same device, because of the effect of the action exerted on the pedal lever 3. From the point in time at which the force applied to the A side exceeds that present on the B side, the balancing element 10 is pushed again towards its resting position, and the lever 9 becomes the only one to act on the cam 7.

Analogous considerations can be made in case the pedal lever 3 is actuated when the hand-lever 4 is already being actuated.

In conclusion, the braking torque developed by the braking assembly 1 results proportional to the greater one only of the forces present on the A and B sides of the balancing element 10, while the braking torque developed by the braking assembly 2 results only proportional to the force applied to the pedal lever 3, both whether this results lower, or it results higher than the force applied to the hand-lever 4. Therefore, the forces exerted on the braking assembly 1 by the pedal lever 3 and by the hand-lever 4, in case of their contemporaneous usage, are not added to each other, and in this way the jamming, and hence the skidding, of the front wheel is prevented.

The action of the pedal lever 3 on the braking assemblies 1 and 2 takes place in the following way: the lever 3 deforms the sheath 5B by applying a thrust to one of its ends, so to tension a wire 5C, running inside the sheath 5B, which applies a traction, at its ends, to the lever 8, which actuates the cam 7, and to a lever 12, which actuates the cam 6.

Figure 2:
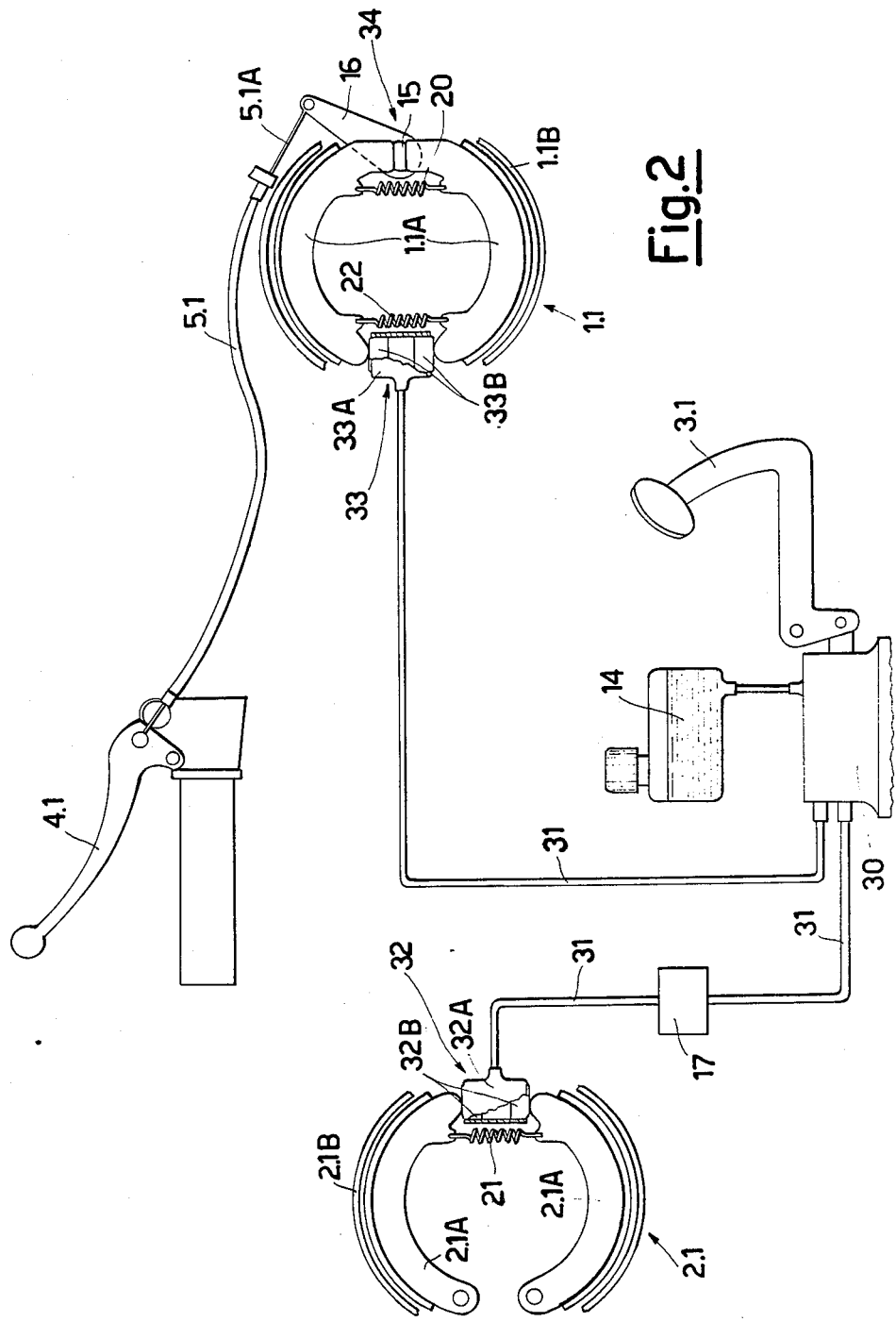
FIG. 2 shows a schematic view of a second braking system for two-wheelers, according to the invention.

The braking system of FIG. 2 comprises furthermore a braking assembly 1.1 of the front wheel, a braking assembly 2.1 of the rear wheel, a normal-duty pedal lever 3.1, and an emergency hand-lever 4.1. The system comprises furthermore a hydraulic unit 30 actuated by the pedal lever 3.1, an oil tank 14, hydraulic transmission circuits 31 for the transmission of the action applied to the pedal lever 3.1, hydraulic means 32 of actuation of the braking assembly of the rear wheel, hydraulic means 33 of actuation of the braking assembly of the front wheel, mechanical means 34 of actuation of the braking assembly of the front wheel connected through a lever 16 to transmission means 5.1 for the transmission of the action applied to the hand-lever 4.1. Furthermore, a regulator 17 is provided for the regulation of the pressure existing inside the hydraulic system, connected to the actuation means 32.

Each one of the hydraulic actuation means 32 and 33 comprises a cylinder, inside which two pistons, opposite to each other, slide; the cylinder and the two pistons of the means 32 are respectively indicated with 32A and 32B, and those of the means 33 are respectively indicated with 33A and 33B. Each cylinder is connected with the hydraulic unit 30 through the hydraulic circuit 31. The action of the pedal lever 3.1 on the hydraulic unit 30 causes the mutual taking away of the pistons of each piston couple. During their mutual taking away, each couple of pistons moves two shoes, equipped with friction linings, against the drum of a respective braking assembly; the two shoes and the drum, partially shown, of the front braking assembly 1.1, are respectively indicated wtih 1.1A and 1.1B, while those of the rear braking assembly 2.1 are respectively indicated with 2.1A and 2.1B.

The mechanical means of actuation 34 comprises a cam 15 actuated by the lever 16 linked through a tensile-resistant wire 5.1A of the transmission means 5.1 to the hand-lever 4.1.

Also the cam 15 acts on the shoes 1.1A, moving them against the drum 1.1B; such action is applied to ends of the shoes 1.1A, which are opposite to the ends on which the pistons 33B act.

In the braking assembly 1.1, two springs 20 and 22 are provided, which act on the shoes 1.1A in correspondence of the cam 15 and of the pistons 33B respectively, for bringing the same shoes back to their resting positions.

In the braking assembly 2.1, for the purpose of bringing the shoes 2.1A back to their resting position, only a spring 21 acts in correspondence of the pistons 32B.

Analogously to what occurs in the system shown in the diagram of FIG. 1, the actuation of the hand-lever 4.1 produces the actuation of the braking assembly 1.1 of the front wheel only, and that can be observed even more easily than in the preceding diagram, thanks to the provision of the direct link between the cam 15 and the same hand-lever 4.1; the actuation takes place, in this case, on the side diametrically opposite to that on which the actuation means 33 linked to the pedal lever 3.1 are active; but the end result remains clearly unchanged.

Furthermore, analogously to what happens for the contemporaneous actuation of the braking assemblies in the diagram of FIG. 1, with this system too the application of a force to the hand-lever 4.1 subsequently to force already applied to the pedal lever 3.1 does not produce any additional useful effects, at least until the two pistons 33B of the actuation means 33 are not completely pushed inside the relevant cylinder 33A, thus generating again two reference points around which the shoes 1.1A of the braking assembly 1.1 can furthermore rotate and thus increase the braking torque applied to the front wheel; but, in any case, the pressure existing inside the hydraulic system remains unchanged, and anyway only associated to the force applied to the pedal lever 3.1, and to this force only.

In general, situations analogous to those as disclosed for the system of FIG. 1 occur. In this case, the force balancing elements are constituted by the same shoes 1.1A. The pressure regulator 17 is a value which has the function of limiting the maximum value of pressure existing inside the portion of hydraulic system comprised between said regulator and the braking assembly 2.1; said pressure limitation is performed for the purpose of approximating, as far as possible, an optimum law of distribution of the braking torques.

Figure 5:
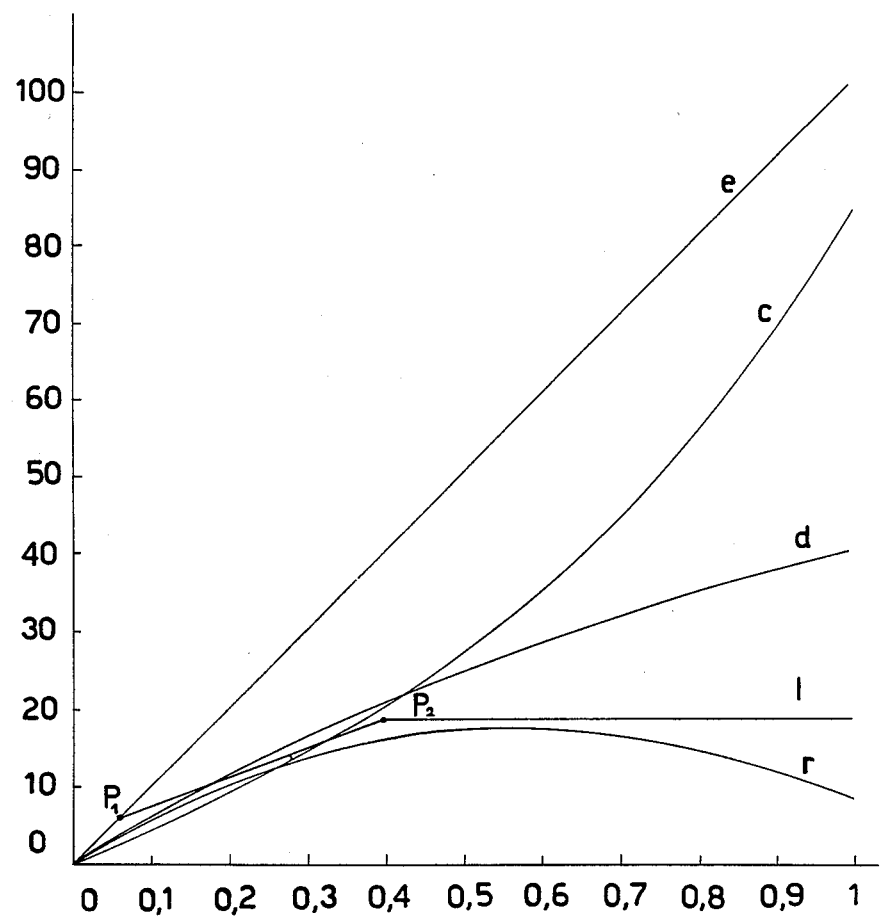
FIG. 5 shows a chart relating to the system of FIG. 2.

In particular, in FIG. 5 a chart is shown, which shows the percent braking efficiency (on the ordinates) as a function of the tyre-road adherence coefficient (on the abscissae) under various braking conditions. The curve "c" relates to the actuation of the front braking assembly only, the curve "d" relates to the actuation of the rear braking only (in the systems shown, this latter type of actuation is not possible, the straight line "e" relates to the action of both of braking assemblies. The curve "r" indicates the optimum law of distribution of the braking torques between the two wheels of the vehicle, for the purpose of obtaining the maximum percent deceleration values which can be obtained from the vehicle, the ordinates under said curve "r" are proportional to the braking torques to be applied to the rear wheel, and the ordinates comprised between the curve "r" and the straight line "e" are proportional to the braking torques to be applied to the front wheel.

Said line "l" is composed, in reality, because of industriality requirements, by a three-segment broken line: in fact, this way of approximating the optimum curve "r" is the way which represents the best compromise between cheapness, reliability and level of performance which can be reached.

The three above-said segments are respectively due:

as relates to the segment going from the origin 0 to the point $P_1$, to a greater stiffness of the spring 22 of the braking assembly 1.1 than of the spring 21 of the braking assembly 2.1; that fact causes the braking assembly 2.1 to be the only braking assembly to be actuated in case of low values of load applied to the pedal lever 3.1; this fact, even if it does not represent the optimum relatively to the distribution of the braking torques, allows however the subsequent length of the distribution law to be straightened, with such a straightening undoubtedly favouring the industriality;

as relates to the segment comprised between $P_1$ and $P_2$, the related slope is only conditioned by the law of response of the springs 21 and 22 of the two braking assemblies;

finally, as relates to the last segment, the origin of which is in P₂, it is simply due to the intervention of the pressure regulator 17, which keeps constant the torque developed by the braking assembly 2.1 for loads applied to the pedal lever 3.1 higher than a given value, with the variability of the load having an influence only on the torque generated by the braking assembly 1.1.

The above criteria of approximation of the curve of distribution of the braking torques, as well as the means used for the related obtainment can be anyway varied; in particular, they could be transferred, by using functionally equivalent ocmponents, also to the system of FIG. 1, for the purpose of obtaining an identical law of distribution of the braking torques, which approximates the optimum law.

Figure 3:
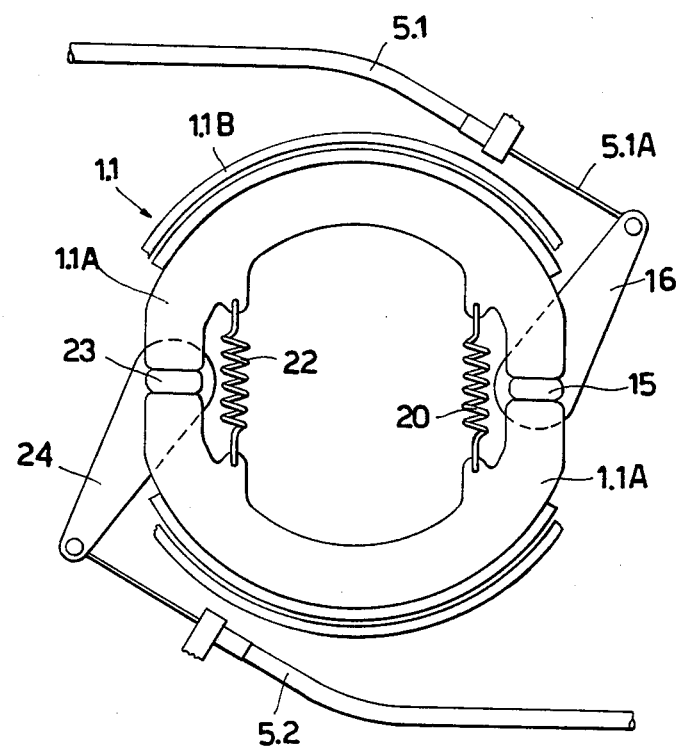
FIG. 3 shows a variant of the diagram of FIG. 2.

The system of FIG. 2 could be furthermore accomplished according to forms of practical embodiment different from the one as above disclosed; for example, FIG. 3 shows a possible further configuration of the front wheel braking assembly; in it, although the two actuation means for the shoes 1.1A are kept distinct and diametrically opposite to each other, solutions of purely mechanical type are present; i.e., with the cam 15, the lever 16 and the transmission means 5.1 between the hand-lever 4.1. and the cam 15 being anyway present, in this case on the opposite side another cam 23 acts, it being actuated by a lever 24 linked, by means of wire-sheath trnasmission means 5.2, to the pedal lever. The wire of the transmission means 5.2 is then linked, analogously to as illustrated in FIG. 1, to the rear wheel braking assembly, thus functionally and structurally repeating what was already disclosed above for such a completely mechanical system.

Figure 4:
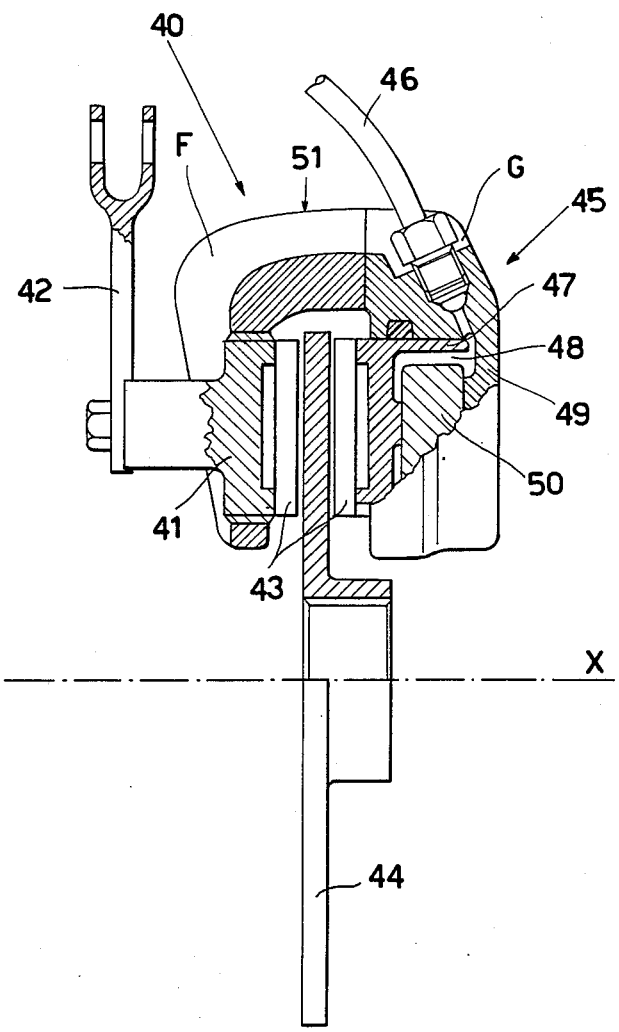
FIG. 4 shows another variant of the diagram of FIG. 2.

FIG. 4 show a totally different braking assembly of the front wheel for the system of FIG. 2, i.e., a disc-braking assembly, indicated with 40, equipped with a floating caliper 51, actuated, analogously to what occurs for the braking assembly 11 of FIG. 2, both by means of an actuation system of mechanical type, and by an actuation means of hydraulic type.

It is observed in fact that the elements equivalent to the cam 15 and to the lever 16 of FIG. 2 are respectively represented, in this case, by the threaded element 41 on the F side of the floating caliper 51 and by the lever 42, it too linked, by means of transmission means not visible in the Figure, to the hand-lever 4.1. In this case too, to an action applied to the hand-lever 4.1 only a normal actuation corresponds to the braking assembly of the front wheel, with the simultaneous approaching of two friction elements 43 to the disc 44 force-fitted onto the wheel axle x, such a simultaneous approaching being simply guaranteed by the floating nature of the caliper system used.

On the G side of the braking assembly 40, actuating means 45, analogous to the means 33 present in FIG. 2, are visible; they are linked, by means of hydraulic transmission means 46 to the pedal lever 3.1, and essentially comprise a piston 47 which acts on one of the friction elements 43, driven by the pressure which is generated inside the chamber 48 comprised between the same piston 47 and the outer structure 49 of the floating caliper 51; between said piston 47 and said structure 49, an element, generally indicated with 50, is furthermore interposed, which performs the task of automatically recovering the backlash which is generated by the wear of the material constituting the friction elements 43.

It can be easily verified that by means of this structure too, what was disclosed above for the previous solutions is obtained; once that the pedal lever 3.1 is already being actuated, with the consequent engagement of the actuation means 45, a further possible action performed on the hand-lever 4.1, and hence on the element 41, does not produce any further additional braking torque on the front wheel, al least until the reaction force arising on the F side of structure 49 due to the effect of the action exerted by the element 41, and which is transmitted to the G side of the same structure, does not come to an equilibrium with the force, of opposite direction, deriving from the pressure of the liquid present inside the chamber 48, and acting both on the piston 47 and on the structure 49 of the braking assembly 40. Once that the force developed by the element 41 exceeds that generated by the pressure inside the chamber 48, the structure 49 moves back to its resting position, in which position it can constitute again a stable reaction point for the element 41, which, from now on, can hence apply a further pressure to the friction elements 43 if an adequate action is exerted on it by means of the lever 42 linked, as already said, to the hand-lever 4.1.

In general, situations occur, which are analogous to those as disclosed for the first system of FIG. 1.

In this case, the balancing element is constituted by the body of the same floating caliper 51.

Summing up, from what has been disclosed above, it emerges that for each exemplifyng solution shown, such an operation way is obtained that, by contemporaneously acting on the normal-duty actuation member and on the emergency actuation member of a two-wheeler, the rear braking torque results directly proportional to the force applied to the normal-duty actuation element, while the front braking torque follows the behaviour of the force applied to the emergency actuation member, if this force is greater than that applied to the normal-duty actuation member, otherways it follows the behaviour of the force applied to the emergency actuation member.

I claim:

1. Braking system for two-wheelers comprising a front wheel braking assembly, a rear wheel braking assembly, a normal-duty actuation member connected with both of said braking assemblies, an emergency actuation member connected with one of said two braking assemblies, members of transmission of the actuation force from said actuation members to friction members of the said braking assemblies, and means for balancing the actuation force applied by the normal-duty actuation member and the actuation force applied by the emergency actuation member on said one of said braking assemblies such that said balancing means enables only the greater of the two actuation forces to be applied as the braking action to said one braking assembly when both actuation members are actuated and in the absence of the cumulative effect of both actuation forces.

2. Braking system according to claim 1, wherein said balancing means comprise at least a balancing element on which the above said two actuation forces act, when either of the said two actuation forces is greater than the other one, with said balancing element moving to a position wherein the lower force is neutralized and the greater force exerts its braking action on said one of said two braking assemblies.

3. Braking system according to claim 2, wherein said braking assembly of the front wheel, and said braking assembly of the rear wheel comprise each, as their friction elements, two shoes provided with friction linings, which press on a drum due to the action of a cam, and wherein the transmission member for the transmission of the force of actuation of the normal-duty actuation element comprises a wire, guided by sheaths, linked to the cam of the braking assembly of the front wheel, and to the cam of the braking assembly of the rear wheel, and the transmission member for the transmission of the force of actuation of the emergency element comprise, it too, a wire, guided by a sheath, linked to the cam of the said one of said two braking assemblies, the link between the cam of said one of said two braking assemblies, and the above said two wires being performed by means of two levers, respectively constrained to the one and to the other one of said two wires, and acting on a common element integral with the cam, said balancing element being constituted by a mechanical element slidingly mounted along said wires, in such a position that on an end of said balancing element a first lever of said two levers, linked to a first wire of the said two wires, acts, while on an opposite end of said balancing element an end acts of the sheath of the second wire of said two wires, when the actuation force transmitted along the second wire is greater than the actuation force transmitted along the first wire, said balancing element pushing the first lever toward a stop position, for the purpose of allowing the second lever to be actuated.

4. Braking system according to claim 2, wherein said one of said two braking assemblies to which both the emergency actuation element and the normal-duty actuation element is linked, comprises, as its friction elements, two shoes provided with friction linings which press on a drum due to the action of two actuation devices, with one of said two actuation devices acting on two ends, respectively of the one shoe and of the other shoe, the other of said devices acting on other two ends of the one and of the other shoe, opposite to the preceding two ends, each shoe constituting said balancing element.

5. Braking system according to claim 4, wherein an actuation device is constituted by a couple of hydraulic cylinders linked to the normal-duty actuation member by means of a hydraulic circuit, while the other actuation device is constituted by a cam linked to the emergency actuation member by means of a wire guided inside a related sheath.

6. Braking system according to claim 5, wherein said hydraulic circuit linked to the normal-duty actuation system is also linked to a further couple of hydraulic cylinders, which act on two ends respectively of one shoe and of another shoe, which press on a drum of the other of said braking assemblies.

7. Braking system according to claim 6, wherein on said shoes of the one braking assembly and of the other braking assembly, calibrated elastic elements act in contraposition to the action of the cam and of the hydraulic cylinders.

8. Braking system according to claim 6, wherein the length of hydraulic system connected with said further couple of cylinders is intercepted by a pressure regulator.

9. Braking system according to claim 8, wherein said pressure regulator is constituted by a pressure limiting valve.

10. Braking system according to claim 4, wherein said actuation devices are constituted by two cams, one cam being linked to the normal-duty actuation element by means of a wire guided inside a relevant sheath, and the other cam being linked to the emergency actuation element by means of another wire guided inside a relevant sheath.

11. Braking system according to claim 10, wherein said wire linked to the normal-duty actuation member is also linked to a cam actuating two shoes, which press on a drum of the other of said braking assemblies.

12. Braking system according to claim 2, wherein said one of said braking assemblies to which both the emergency actuation element and the normal-duty actuation element are linked, comprises two friction elements which press on a disc due to the action of two actuation devices which react on the body of a common floating caliper, the body of said floating caliper constituting the balancing element.

13. Braking system according to claim 12, wherein an actuation device is constituted by a hydraulic cylinder linked to the normal-duty actuation element by means of a hydraulic circuit, and the other actuation device is constituted by an element which is screwed down inside a threaded seat of the body of the floating caliper and which is actuated by a lever linked by means of a wire, and related sheath, to the emergency element.

14. Braking system according to claim 1, wherein said one of said braking assemblies is the braking assembly of the front wheel.

15. Braking system according to claim 1, wherein a regulator of the actuation force is provided, positioned along the transmission element which links said normal-duty actuation member to the other one of said braking assemblies.

16. Braking system according to claim 7, wherein the length of hydraulic system connected with said further couple of cylinders is intercepted by a pressure regulator.

* * * * *